(12) United States Patent
Gladel et al.

(10) Patent No.: US 10,823,117 B2
(45) Date of Patent: Nov. 3, 2020

(54) WATER INJECTION DEVICE FOR AN INTERNAL COMBUSTION ENGINE AND WATER INJECTION METHOD

(71) Applicant: Robert Bosch GmbH, Stuttgart (DE)

(72) Inventors: Pascal Gladel, Stuttgart (DE); Peter Schenk, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/237,969

(22) Filed: Jan. 2, 2019

(65) Prior Publication Data

US 2019/0203665 A1 Jul. 4, 2019

(30) Foreign Application Priority Data

Jan. 4, 2018 (DE) .................. 10 2018 200 091

(51) Int. Cl.
*F02M 25/028* (2006.01)
*F02M 25/022* (2006.01)

(52) U.S. Cl.
CPC ....... *F02M 25/028* (2013.01); *F02M 25/0221* (2013.01)

(58) Field of Classification Search
CPC .......... F02M 25/028; F02M 25/0221
USPC ....................................... 123/25 A
See application file for complete search history.

(56) References Cited

U.S. PATENT DOCUMENTS

| | | | | |
|---|---|---|---|---|
| 4,558,665 A | * | 12/1985 | Sandberg | ........... F02M 25/028 123/25 A |
| 2019/0107080 A1 | * | 4/2019 | Heidemeyer | ........ F02M 25/025 |

FOREIGN PATENT DOCUMENTS

| | | |
|---|---|---|
| DE | 199 18 591 A1 | 10/2000 |
| DE | 10 2015 208 476 A1 | 11/2016 |
| WO | 2010/112254 A1 | 10/2010 |
| WO | 2018/050894 A1 | 3/2018 |
| WO | 2018/091670 A1 | 5/2018 |

* cited by examiner

*Primary Examiner* — Joseph J Dallo
*Assistant Examiner* — Yi-Kai Wang
(74) *Attorney, Agent, or Firm* — Maginot, Moore & Beck LLP

(57) ABSTRACT

A water injection device for an internal combustion engine includes at least one water tank for storing water, at least one water injector for injecting water into the engine, at least one conveyor module including a conveyor element for conveying water from the water tank into the water injector, at least one first connection, at least one second connection, and at least one third connection. The first connection is configured on the conveyor module which is connected to the water tank by at least one first line. The second connection is configured on the conveyor module which is connected by at least one second line to the water injector. The third connection is configured on the conveyor module which is connected to the water tank by at least one return line. The conveyor module includes at least one heating device for heating water flowing through the conveyor module.

8 Claims, 3 Drawing Sheets

WATER INJECTION DEVICE FOR AN INTERNAL COMBUSTION ENGINE AND WATER INJECTION METHOD

This application claims priority under 35 U.S.C. § 119 to patent application no. DE 10 2018 200 091.3, filed on Jan. 4, 2018 in Germany, the disclosure of which is incorporated herein by reference in its entirety.

BACKGROUND

The disclosure relates to a water injection device for an internal combustion engine and a method for operating a water injection device of this kind.

Increasing demands for lower carbon dioxide emissions mean that internal combustion engines are being increasingly optimized in terms of their fuel consumption. However, internal combustion engines known in the art cannot be operated optimally in respect of fuel consumption at high-load operating points, as their operation is limited by a knocking tendency and high exhaust gas temperatures. A possible measure for reducing the knocking tendency and lowering the exhaust gas temperatures is the injection of water. In this case, separate water injection systems are customarily present, in order to facilitate water injection. Hence, for example, a water injection system for an internal combustion engine is known from DE 10 2015 208 476 A1.

A water tank is normally provided in the case of water injection systems for internal combustion engines, so that water is available at any time for injecting into the intake manifold or the combustion chamber of the internal combustion engine. In addition, with water injection systems of this kind, water can be acquired with the help of a water extraction plant, for example from the exhaust gas system of the internal combustion engine in the motor vehicle, or from the environment of the motor vehicle, and also supplied to the water tank, for example. From the water tank, water can be transported via a distributor device by means of a pump, for example, to injection valves through which the water is then injected into an intake manifold or a combustion chamber of the internal combustion engine, for example. For this purpose, as in the case of fuel injection systems, the distributor device in the form of a rail, for example, can be provided for storing water and distributed between a plurality of injection valves through which water can then be injected.

A particular feature of injection devices for water compared with injection devices for fuels is that the water in the water injection device, in particular in the water tank, can freeze after the internal combustion engine has been switched off, for example. So that the water injection device can then be started up again, the frozen water must be thawed. Electrical heaters, for example, may be provided in the water-injection device for this purpose.

SUMMARY

According to the disclosure, a water injection device for an internal combustion engine comprising at least one water tank for storing water, at least one water injector for injecting water into the internal combustion engine, at least one conveyor module with a conveyor element for conveying water from the water tank into the water injector is proposed. According to the disclosure, at least a first connection is configured on the conveyor module which is connected to the water tank by at least a first line, wherein at least a second connection is furthermore configured on the conveyor module which is connected by at least a second line to the water injector, wherein at least a third connection is furthermore configured on the conveyor module which is connected to the water tank by at least one return line, wherein the conveyor module comprises at least one heating device for heating water flowing through the conveyor module.

The water injection device for an internal combustion engine has the advantage over the prior art that water thawed in the water tank can be transported to the conveyor module with the heating device through the first line. The water can be heated with the help of the heating device in the conveyor module and then transported back again into the water tank through the return line. In this way, the heated water transported back into the water tank again can heat and/or melt further water, for example frozen water in the water tank. Water can therefore be transported from the water tank through the first line, the conveyor module and the return line, back into the water tank again where it can heat the water tank and/or further frozen and/or thawed water located in the water tank. The water can therefore be advantageously transported in the circuit, wherein the water passes through the conveyor module with the heating device when being transported in the circuit, wherein on passing through the heating device, the water absorbs heat from said heating device and on passing through the water tank can deliver heat to frozen and/or unfrozen water in the water tank. Consequently, where there is frozen water in the water injection device, a small amount of thawed water can advantageously be transported in the circuit from the water tank, first line, conveyor module and return line. In this way, the water can absorb heat in the heating device and transmit it to frozen water in the water injection device, so that all the water in the water injection device can be thawed.

In this case, the water already present in the water injection device which is also provided for injection is used for heating the water injection system. The thermal attachment of the heating device is advantageously realized simply by the water already present in the water injection device.

Further advantageous embodiments and developments of the disclosure are facilitated by the features indicated in the dependent claims.

According to an advantageous exemplary embodiment, it is provided that the conveyor module comprises a module housing, wherein the heating device is arranged in the module housing. Hence, for example, all components arranged in the module housing, such as the conveyor element, for example, or a shut-off valve, a non-return valve, a diaphragm and/or a pressure sensor are heated. Furthermore, all lines arranged in the module housing and therefore also all water flowing through the module housing can be heated advantageously well by the heating device. For this purpose, the components and lines arranged in the module housing may be in direct heat-conducting contact with one another or, for example, also in contact with one another in a heat-conducting manner by means of heat-conducting structural elements. Consequently, the entire water injection system can be heated advantageously well and efficiently by a conveyor module designed in this way.

According to an advantageous exemplary embodiment, it is provided that the first connection and/or the second connection and/or the third connection are formed on the module housing.

According to an advantageous exemplary embodiment, it is provided that the conveyor module comprises at least one shut-off valve and/or a non-return valve and/or a diaphragm and/or a pressure sensor. Consequently, an advantageously compact design of the conveyor module can be achieved and the shut-off valve and/or the non-return valve can be advantageously heated and thawed along with the water in the injection system and the conveyor element by the heating device.

According to an advantageous exemplary embodiment, it is provided that the conveyor module comprises a shut-off valve arranged in the module housing of the conveyor module and/or a non-return valve arranged in the module housing of the conveyor module and/or a diaphragm arranged in the module housing of the conveyor module and/or a pressure sensor arranged in the module housing of the conveyor module. Through these structural elements arranged in the module housing, the heat from the heating device can be delivered to the structural elements advantageously well and easily. Moreover, the conveyor module can be configured in an advantageously compact manner.

In accordance with an advantageous exemplary embodiment, it is provided that the water injection device comprises a pre-heating device for pre-heating water in the water tank. Through the heating device, a quantity of water can be melted in the water injection device. This amount of melted water can be supplied to the conveyor module via the first line and further heated there with the help of the heating device and conveyed back again via the return line into the water tank. In this circulation, the water may transmit heat to more frozen water and melt it.

According to an advantageous exemplary embodiment, it is provided that the pre-heating device is arranged on the water tank. Consequently, frozen water in the water tank can be pre-thawed by the pre-heating device and then fed via the first line to the conveyor module and heated there. From there, it can be conveyed back to the water tank through the return line, where it can thaw further frozen water.

Furthermore, a method of operating a water injection device for an internal combustion engine is proposed according to the disclosure. The water injection device comprises at least one water tank for storing water and at least one water injector for injecting water into the internal combustion engine and at least one conveyor module for conveying water from the water tank to the injection valve. The steps involved in the method comprise a step for conveying water from the water tank into the conveyor module through a forward line, a step for heating the water in the conveyor module by a heating device arranged in the conveyor module, a step for returning the heated water from the conveyor module to the water tank through a return line, a step for conveying water from the water tank to the water injector through the conveyor module and injecting water through the water injector into the internal combustion engine. The method according to the disclosure enables frozen water in the water injection device to be thawed by a small amount of already liquid water by conveying and heating the already liquid water.

According to an advantageous exemplary embodiment of the method, it is provided that the steps involved in the method furthermore comprise a step for pre-heating frozen water in the water tank by means of a pre-heating device. By means of the pre-heating device, frozen water in the water tank can be pre-thawed and then supplied to the conveyor module via the first line and heated there. From there, it can be conveyed back to the water tank again in the return line and thaw more frozen water there.

BRIEF DESCRIPTION OF THE DRAWINGS

Exemplary embodiments of the disclosure are depicted in the drawing and are explained in greater detail in the following description. In the drawing

DETAILED DESCRIPTION

A water injection device 1 of an internal combustion engine 2 is described in detail below according to various exemplary embodiments with reference to the figures. In particular, the internal combustion engine 2 is operated according to the spark-ignition principle with direct petrol injection.

Figure 1:
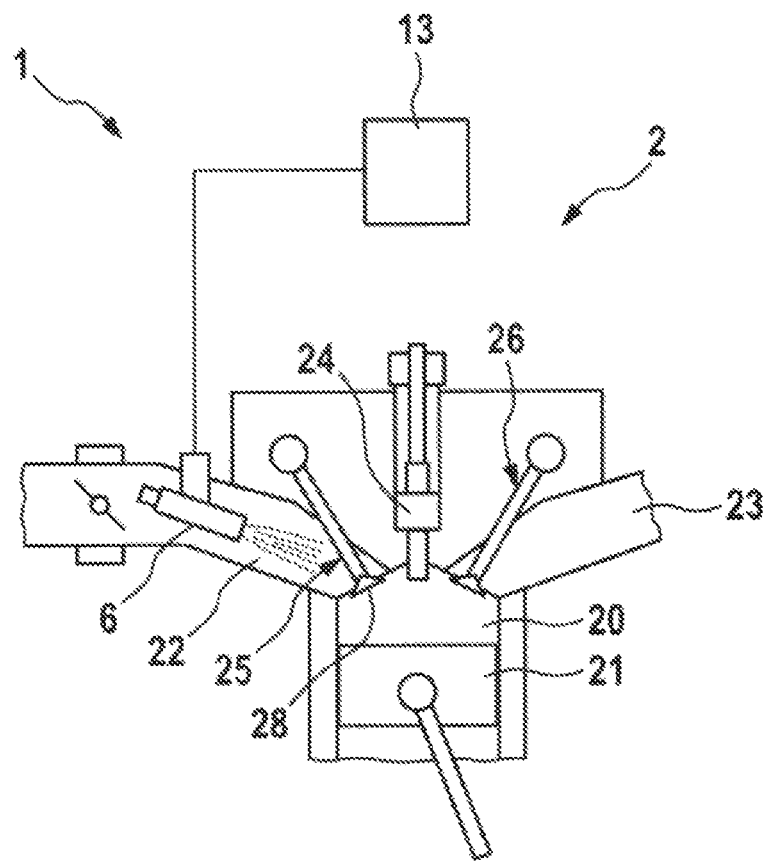
FIG. 1 shows a schematic view of an internal combustion engine with a water injection device.

FIG. 1 shows schematically the internal combustion engine 2 and also the water injection device 1. The internal combustion engine 2 has a plurality of cylinders. The internal combustion engine 2 comprises a combustion chamber 20 for each cylinder, in which combustion chamber a piston 21 can be moved back and forth. In addition, the internal combustion engine 2 has an intake port 22 for each cylinder, for example, via which air is supplied to said combustion chamber 20. Exhaust gas is removed via an exhaust duct 23. For this purpose, an inlet valve 25 is arranged at the intake port 22 and an outlet valve 26 is arranged at the exhaust duct 23. Reference number 24 further relates to a fuel injection valve.

The water injection device 1 in this case is an injection device through which water is injected into the internal combustion engine 2. In this case, in addition to water, other media can also be blended with the water and stored, transported and injected along with the water. Consequently, alcohols such as ethanol or methanol, or other additives which prevent the water from freezing, for example, can be added to the water.

The water injection device 1 comprises at least one water injector 6. The water injector 6 is arranged on the inlet channel 22. The water injector 6 injects water into the inlet channel 22 of the internal combustion engine 2. The water injector 6 is controlled by a control unit 13, for example. In this exemplary embodiment, one water injector 6 is provided per cylinder. Alternatively, for better processing or in order to increase the maximum amount of water that can be injected per combustion cycle, two water injectors are arranged per cylinder. However, only one water injector 6 may also be provided for all cylinders, for example.

Figure 2:
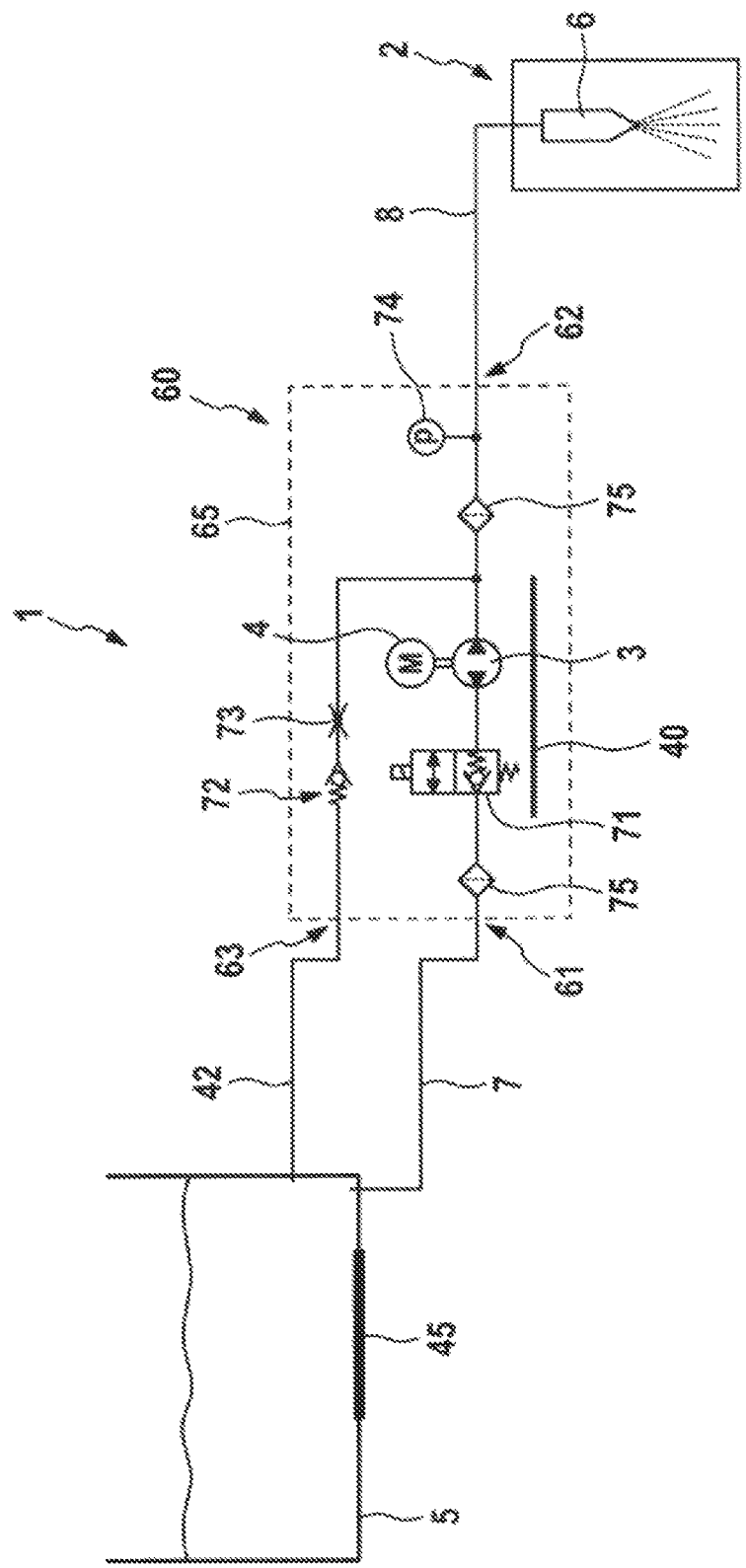
FIG. 2 shows a water injection device according to a first exemplary embodiment of the disclosure.
Figure 3:
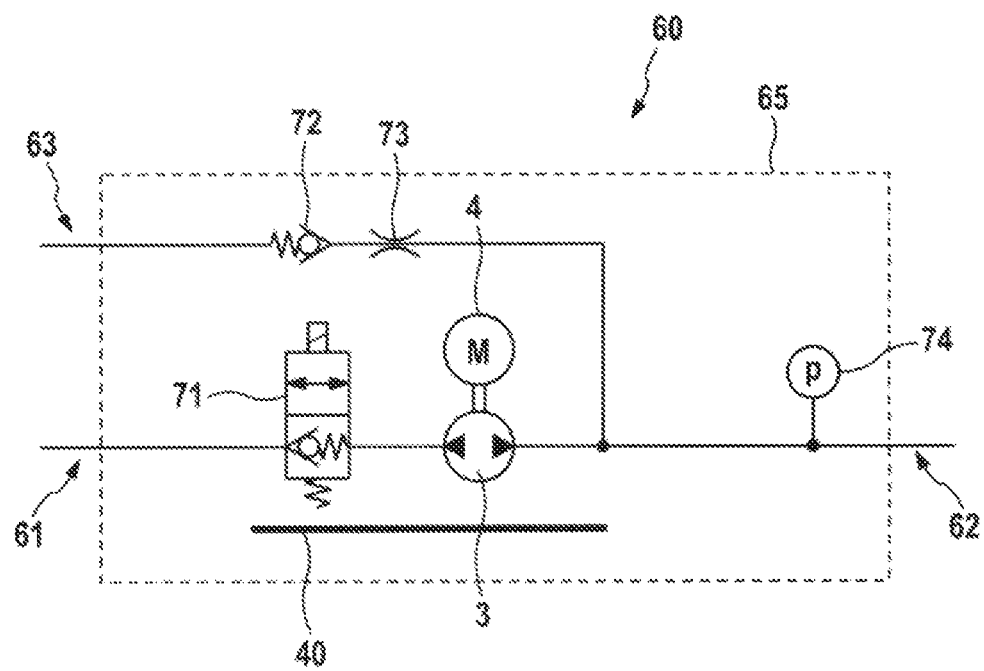
FIG. 3 shows a schematically depicted exemplary embodiment of a conveyor module.

An exemplary embodiment of a water injection device 1 is depicted in FIG. 2. The water injection device 1 comprises a water tank 5 in which water is stored. The water injection device 1 further comprises water injectors 6. The water injectors 6 may be attached to a distributor 9 which is not shown in the figures, for example, which distributes water to the water injectors 6. The water injectors 6 are provided for injecting water into the internal combustion engine 2 of a motor vehicle. The water injectors 6 are connected to the water tank 5 by a line 7, 8. The line 7, 8 comprises a first line 7 which connects the water tank 5 to the conveyor module 60. Furthermore, the line 7, 8 comprises a second line 8 which connects the conveyor module 60 to the water injector 6.

The conveyor module 60 comprises a conveyor element 3. The conveyor element may be configured as a pump, for example. The conveyor element 3 is integrated into the conveyor module 60, for example. The conveyor element 3 may convey water from the water tank 5 to the water injectors 6. Furthermore, the conveyor element 3 may convey water from the water tank 5 through the first line 7 to the conveyor module 60 and via the return line 42 back again into the water tank 5.

As shown in FIG. 2, the conveyor module 60 comprises a module housing 65. The module housing 65 is shown schematically in FIG. 2. The conveyor element 3 is arranged in the module housing 65 and therefore integrated in the filter module 60. The module housing 65 surrounds the conveyor element 3, for example, and in this way forms the conveyor module 60. Connections 61, 62, 63 are formed on the conveyor module 60. The first connection 61 is connected to the water tank 5 by a first line 7. The second connection 62 is connected to the water injector 6 by the second line 8. The third connection 63 is connected to the water tank 5 by the return line 42. Water can flow into the conveyor module 60 via the first connection 61 and via the second connection 62 or the third connection 63 out of the conveyor module 60 again.

The conveyor module 60 divides the line 7, 8 into a first line 7 and a second line 8. The water tank 5 in this case is connected to the conveyor module 60 by the first line 7. Furthermore, the conveyor module 60 is connected to the water injectors 6 by the second line 8. Water from the water tank 5 can therefore be transported via the first line 7 to the conveyor module 60 further through the second line 8 to the water injectors 6.

In the exemplary embodiments of the injection device 1 depicted in the figures, the conveyor module 60 furthermore comprises a shut-off valve 71, a non-return valve 72, a diaphragm 73 and a pressure sensor 74. The shut-off valve 71, the non-return valve 72, the diaphragm 73 and the pressure sensor 74 are arranged in the module housing 65.

Furthermore, the conveyor module 60 of the water injection device 1 comprises a heating device 40. The heating device 40 is provided for heating water which flows through the conveyor module 60. The heating device 40 may, for example, be configured as an electrical heating device and/or as a hydraulic heating device. The heating device 40 is connected in a thermally conductive manner to lines, for example, which run through the conveyor module 60 or to structural elements arranged in the conveyor module 60, such as the shut-off valve 71, the non-return valve 72, a diaphragm 73 or the pressure sensor 74, for example. For this purpose, thermally conductive structural elements which are not shown in the schematic figures can connect the heating device 40 in a thermally conductive manner to the lines in the conveyor module 60 and/or the other structural elements arranged in the module housing 65, for example the shut-off valve 71 or the non-return valve 72.

The heating device 40 is provided for heating water which flows through the conveyor module 60. Water can be supplied to the conveyor module 60 for this purpose. The water injection device 1 comprises a first line 7 for this purpose. The water tank 5 is connected to the conveyor module 60 by the first line 7. Furthermore, the water injection device 1 comprises a return line 42. The conveyor module 60 is connected to the water tank 5 by the return line 42. Water can therefore be supplied to the conveyor module 60 via the first line 7 and via the return line 42 from the conveyor module 60 back into the water tank 5. The water tank 5, the first line 7, the conveyor module with the heating device 40 and the return line 42 therefore together form a circuit in which water can be transported from the water tank 5 through the first line 7, the heating device 40 and the return line 42 back again to the water tank 5. When the water circulates through this circuit, the water is heated by the heating device 40 and transports the heat absorbed into other parts of the circuit and/or the water injection device 1 where it can advantageously thaw frozen water.

The first line 7, the conveyor module 60, the return line 42 and the water tank 5 together form a water circuit, wherein the water stored in the water tank 5 can be conveyed back via the first line 7 to the conveyor module 60 with the heating device 40 and via the return line 42 back into the water tank 5 again.

Furthermore, the water injection device 1 in this exemplary embodiment comprises a pre-heating device 45 which is set up to pre-thaw water in the water tank 5, so that the pre-thawed water can be supplied to the conveyor module 60 via the first line 7. In this exemplary embodiment, a pre-heating device 45 is arranged on the water tank 5 and is set up to heat the water tank 5 and to melt frozen water in the water tank 5 at least partially. The pre-heating device 45 may be an electrical heater, for example, which is powered by the vehicle's on-board electrical system. The pre-heating device 45 may, however, also be configured as a hydraulic heating device, for example.

It goes without saying that further exemplary embodiments and mixed forms of the exemplary embodiments shown are also possible.

What is claimed is:

1. A water injection device for an internal combustion engine, comprising:
    at least one water tank configured to store water;
    a pre-heating device configured to pre-heat water in the at least one water tank;
    at least one water injector configured to inject water into the internal combustion engine;
    at least one conveyor module including:
        a conveyor element configured to convey water from the at least one water tank into the at least one water injector; and
        at least one heating device configured to heat water flowing through the at least one conveyor module;
    at least one first connection arranged on the at least one conveyor module and connected to the at least one water tank via at least one first line;
    at least one second connection arranged on the at least one conveyor module and connected to the at least one water injector via at least one second line; and
    at least one third connection arranged on the at least one conveyor module and connected to the at least one water tank via at least one return line.

2. The water injection device according to claim 1, wherein:
    the at least one conveyor module includes a module housing; and
    the at least one heating device is arranged in the module housing.

3. The water injection device according to claim 2, wherein the at least one first connection and/or the at least one second connection and/or the at least one third connection are arranged on the module housing.

4. The water injection device according to claim 1, wherein the at least one conveyor module includes at least one shut-off valve and/or a non-return valve and/or a diaphragm and/or a pressure sensor.

5. The water injection device according to claim 2, wherein the at least one conveyor module includes a shut-off valve arranged in the module housing and/or a non-return valve arranged in the module housing and/or a diaphragm arranged in the module housing and/or a pressure sensor arranged in the module housing.

6. The water injection device according to claim 1, wherein the pre-heating device is arranged on the at least one water tank.

7. A method of operating a water injection device for an internal combustion engine, the water injection device including at least one water tank configured to store water, a pre-heating device configured to pre-heat water in the at least one water tank, at least one water injector configured to inject water into the internal combustion engine, and at least one conveyor module including a conveyor element arranged within the at least one conveyor module configured to convey water from the at least one water tank to the at least one water injector, the method comprising:
- conveying water from the at least one water tank into the at least one conveyor module through a first line;
- heating water in the at least one conveyor module via a heating device arranged in the at least one conveyor module;
- returning heated water from the at least one conveyor module to the at least one water tank through a return line;
- conveying water from the at least one water tank to the at least one water injector through the at least one conveyor module; and
- injecting water through the at least one water injector into the internal combustion engine.

8. The method according to claim 7, further comprising:
- pre-heating frozen water in the at least one water tank via the pre-heating device.

* * * * *